Sept. 29, 1970 P. F. AEMMER ETAL 3,531,652

ACTIVE NARROW NOTCH FILTER

Filed March 20, 1968 3 Sheets-Sheet 1

INVENTORS
PETER F. AEMMER
HANS MUELLER

BY Arthur H. Seidel

ATTORNEY

INVENTORS
PETER F. AEMMER
HANS MUELLER

BY

Arthur H. Seidel

ATTORNEY

ACTIVE NARROW NOTCH FILTER

Filed March 20, 1968 3 Sheets-Sheet 3

INVENTORS
PETER F. AEMMER
HANS MUELLER

BY

Arthur H. Seidel

ATTORNEY

United States Patent Office 3,531,652
Patented Sept. 29, 1970

3,531,652
ACTIVE NARROW NOTCH FILTER

Peter F. Aemmer, Monroeville, Pa., and Hans Mueller, Milwaukee, Wis., assignors to Allen-Bradley Company, Milwaukee, Wis., a corporation of Wisconsin Filed Mar. 20, 1968, Ser. No. 714,727
Int. Cl. H02m *1/12*
U.S. Cl. 307—105 3 Claims

ABSTRACT OF THE DISCLOSURE

An active filter circuit that is adapted for connection between a power source, such as a commercial 60 Hertz source, and a load, which filter functions to pass the power source frequency with very little attenuation while attenuating other frequencies appearing between the power source lines. The pass band of the device is very narrow, and the circuit has a stop-band notch filter connected to the series line of the circuit which feeds an amplifier that in turn delivers a signal to one winding of a correction transformer. The other winding of the transformer is in the power source line extending through the amplifier, and this transformer presents a voltage in the line that is in phase opposition to interference frequencies and which cancels such frequencies, to thereby provide substantially interference free power source voltage to the load. Additional circuit components are also provided to correct for any shift in power source frequency or any shift in the stop-band of the notch filter.

BACKGROUND OF THE INVENTION

The field of the invention is electrical filters for attenuating interference frequencies and passing a desired frequency with very little attenuation. More particularly, the filter of the present invention is suited for insertion between a power source, such as a commercial 60 Hertz source, and an electrical apparatus that is to be operated free of interference voltages of frequencies other than the power source frequency. The interference frequencies contemplated for attenuation by the present invention are of the conducted type, as distinguished from electromagnetic interference, and hence the invention is usable for interference frequencies of up to about the order of 150 thousand Hertz.

Interference voltages appearing on power lines may be due to a number of causes, such as, for example, the switching of loads on and off the lines, rotating machinery, the firing of controlled rectifiers connected to the lines, or other forms of pulsing equipment. Passive filters comprised wholly of static electrical components have been used for attenuating these interference voltages, but such filters are usually designed for use between a power source and a load circuit of fixed impedances, whereas usual power lines present a changing impedance due to the switching of other loads on and off the lines. Filters of such passive components are frequently ineffective under the condition of a changing power source impedance.

In addition to passive filters, the art has also employed conditioning circuits that reduce the interference. These circuits are often characterized by the insertion of undesirably high impedance into the power lines, and such equipment is not satisfactory when very low attenuation of the power source frequency is required. The efficiency of such devices is not as high as desired.

SUMMARY OF THE INVENTION

The present invention relates to an active filter, meaning that it employs power in its operation, and it more particularly resides in the combination of a correction transformer having one winding for insertion in the power line, a narrow stop-band notch filter for connection to the power line that passes interference voltages from the power line while attenuating power source frequency, and an amplifier joined to the output of the notch filter which feeds a second winding of the transformer to induce voltages back into the power line that cancel the original interference voltages on the line.

In the circuit of the invention it is a purpose to feed the interference frequencies back into the line in phase opposition to the original interference, so as to cancel out the interefrence voltages. This is done by the use of the amplifier and the transformer. However, the power source frequency must be blocked from this feed back arrangement, and to secure such blocking a narrow stop-band notch filter is inserted between the line and the amplifier that has a very narrow band characteristic which is aligned with the power source frequency. This narrow stop-band allows all frequencies to be passed to the amplifier except the power source frequency, and hence the amplifier feeds all frequencies but the power source frequency back to the line. As a result, the active filter of the invention provides a very narrow, notch-like pass band between a power source and a load circuit.

It is a particular object of the invention to provide a very narrow pass band in an active type filter, so as to have effective filtering of all interference voltages in the frequency spectrum of conducted interference. Other objects of the invention are to provide a filter that has minimal distortion of the power source voltage, and that presents very little impedance to the power source at the power source frequency in the feeding of power to a load circuit.

With the use of a very narrow band notch filter as a part of the complete active filter, any shift in power source frequency, say for example from 60 Hertz to 60.5 Hertz, will cause a substantial amount of the power source voltage signal to pass through the notch filter, for the reason the band of such a notch filter is very narrow and loses alignment with the shifted power source frequency. In such event, a substantial power frequency signal will be amplified and sent to the correction transformer, whereupon a partial cancellation of the power source frequency appearing in the power line will take place. This causes an unwanted, adverse attenuation of the power source frequency being passed to the load circuit. The same problem will occur if the narrow band of the notch filter drifts, due to some cause such as temperature change of the filter components, while the power source frequency remains constant. Here again the alignment between the narrow band of the notch filter and the power source frequency is lost.

To correct for the foregong problem of loss of alignment, there is included for the circuit of the present invention components that will automatically correct for any shift between power source frequency and the narrow band of the notch filter. This correction is accomplished in the embodiment of the invention disclosed herein by provision of a current generator that beats a signal of power source frequency against the power source frequency signal passing through the notch filter in such controlled amounts that there is a cancellation. The amplifier then feeds only interference frequency signals to the correction transformer, so that there is very little attenuation in the power line of the power source frequency.

Among the additional purposes of the invention are the automatic correction for a phase shift of power source frequency passing through the notch filter, the achievement of size and weight reduction while maintaining the desired attenuation characteristics, and the use of only a single circuit component, i.e. a transformer winding, in the power line. A still further object is the provision of a filter that has the ability to maintain its attenuation in power lines having very small impedances.

An active filter of the type herein may be employed for protection of sensitive laboratory instruments, process control equipment and medical instruments. Another application, illustrating the varied utility of the invention, is in filtering power lines leading into shielded rooms where conducted type of interference below about 150 thousand Hertz must be prevented from entering such rooms.

A PREFERRED EMBODIMENT

Figure 1:
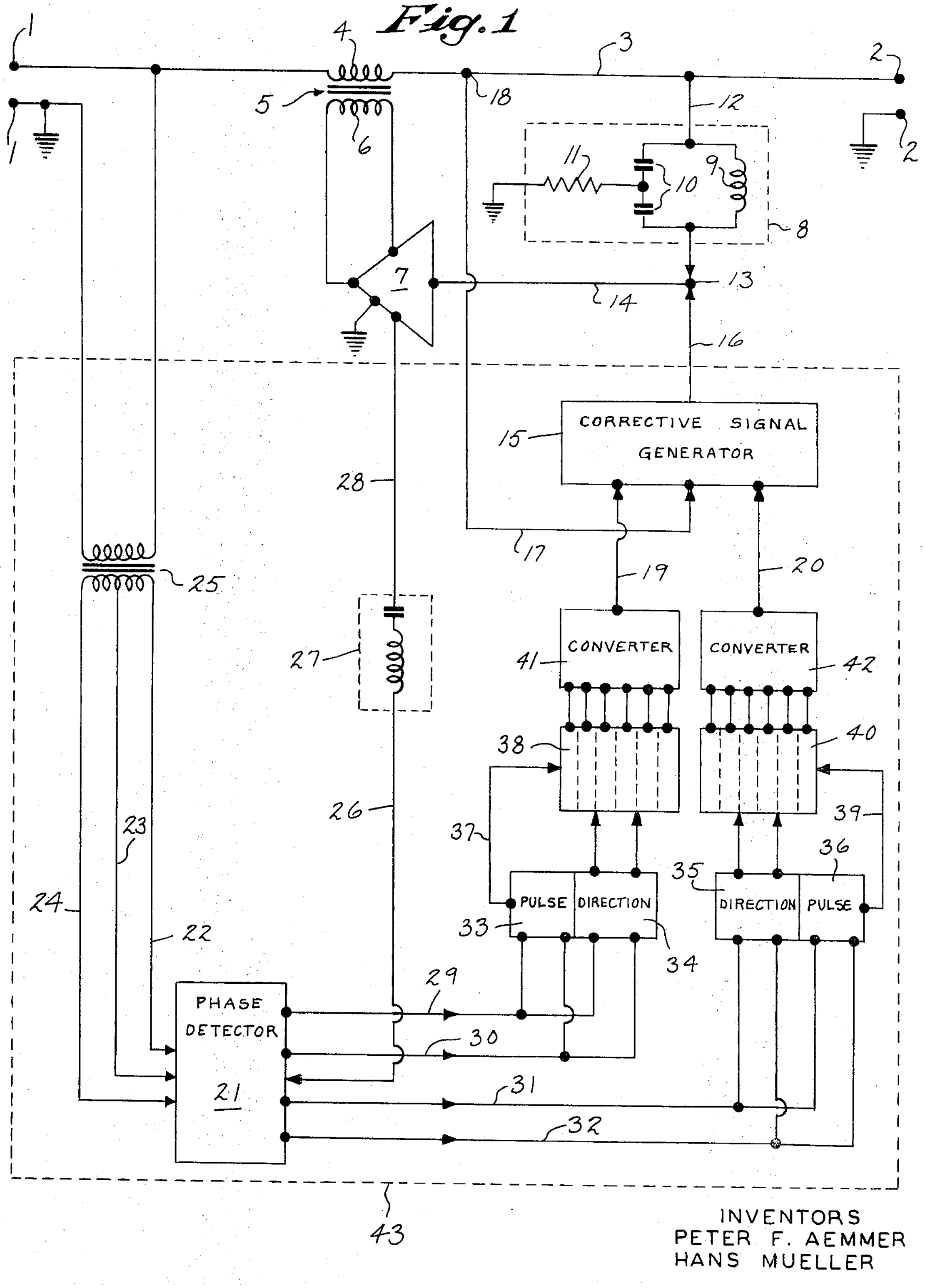
FIG. 1 is a schematic wiring diagram of an active type filter embodying the invention.

Referring now to FIG. 1 of the drawings, there is shown a schematic wiring diagram of an active type filter embodying the invention, with various sub-circuits that comprise the total circuit being shown in block diagram form. The circuit includes a pair of input terminals 1 for connection to a suitable power source, such as a 60 Hertz commercial source, and a pair of outlet terminals 2 for connection to a load to which a pure power source frequency is to be delivered free of interference. Extending between one of the input terminals 1 and one of the output terminals 2 is a power line 3 that has inserted therein a first winding 4 of a correction transformer 5. The second winding 6 of the correction transformer 5 is connected to the output of an amplifier 7, so that output signals from the amplifier 7 delivered to the winding 6 will induce voltages in the winding 4. Hence, the first winding 4 functions as the secondary winding of the correction transformer 5, and the winding 6 acts as the transformer primary winding. A notch filter 8, characterized by a very narrow stop-band, is comprised of an inductance 9 and a pair of capacitors 10 in parallel arrangement, and it also has a resistor 11 with one end connected between the capacitors 10 and the other end connected to ground. This notch filter 8 has its input connected through a lead 12 to the power line 3, and the output side is connected to a point 13, and then from the point 13 through a lead 14 to the input of the amplifier 7.

The notch filter 8, amplifier 7 and correction transformer 5 function as a feed back loop in which frequencies appearing on the power line 3 are fed to the notch filter 8, and frequencies passed by the notch filter 8 are then amplified and sent to the correction transformer 5 which induces voltages in the power line 3 that are in phase opposition to the original signals appearing on the power line. The narrow stop-band of the notch filter 8 blocks passage of the 60 Hertz power source frequency, and thus only allows interference frequencies appearing on the power line 3 to pass to the amplifier 7. Hence, the voltages induced in the winding 4 of the correction transformer 5 are voltages of the interference frequencies, and they are in phase opposition to the original interference signals entering on the power line 3 at the input terminals 1. The time delay of the feed back circuit is negligible, wherefore the voltages induced in the winding 4 will effectively cancel the original interference signals. As a result, the power source frequency of 60 Hertz is fed to the output terminals 2 with very little, if any, distortion due to interference. Further, the impedance presented by the transformer winding 4 to the power source frequency is very small, so that there is very little attenuation of the power source frequency as power passes over the line 3. As a result, the invention provides an extremely effective active type filter for blocking conducted interference frequencies, while simultaneously passing the power source frequency with very little attenuation.

As has been noted hereinbefore, under the summary of the invention, the power source frequency might vary a fraction of a cycle or so, or the narrow stop-band of the notch filter 8 might shift slightly. In either event, the narrow stop-band will lose its alignment with the power frequency, so that a power frequency signal of some low amplitude will appear at the point 13 and at the input of the amplifier 7. If this were permitted to occur, the power source frequency would then be induced through the correction transformer 5 into the power line 3, and as a result the beating of this feed back signal against the incoming power source frequency would cause an unwanted attenuation of the power source voltage. This would impair the operation of the filter, wherefore some means should be incorporated to correct for the problem. The remainder of the circuit, now to be described, provides this necessary correction.

A corrective signal generator 15 which functions to provide a controlled amplitude of power frequency voltage at the point 13 has an input connected to a lead 17, which lead 17 is connected to the power line 3 at a point 18 on the right hand side of the transformer winding 4. The corrective signal generator 15 internally develops a first signal that is in phase with the power source frequency and a second signal that is 90° out of phase with the power source frequency. These two signals are shifted 180° in phase and combined on an output lead 16 extending to and connected with the point 13. The amplitude of the output of the generator 15 is controlled by input control leads 19 and 20 respectively. The control is such that the output of the generator 15 appearing on the lead 16, matches the amplitude of the power source frequency passing through the notch filter 8 to the point 13, and this output is in phase opposition to the power source frequency passing through the notch filter 8, so that at the point 13 there is a beating of two signals that cancels the power source frequency voltage at this point. Wherefore, the signal passing over the lead 14 to the amplifier 7 will not include any significant power source frequency voltage.

For controlling the corrective signal generator 15, there is a phase detector circuit 21 having input leads 22, 23, 24 fed by a supply transformer 25 that has its primary connected to the power lines at the input terminals 1. Thus, these inputs 22, 23, 24 provide the phase detector 21 with a phase reference derived from the power line input to the active filter. The phase detector circuit 21 is also fed by an input lead 26. The input lead 26 connects through a filter 27, for passing power source frequency only, and a lead 28 to the amplifier 7. A signal voltage is fed from the amplifier 7 to the lead 28 which is of the same wave shape as the input to the amplifier 7, but which has been amplified through a part of the amplifier circuit. If desired, the lead 28 could be connected to the lead 14 and a separate amplifier could be inserted in the lead 28 to obtain the desired gain. The filter 27 passes any power source frequency appearing in the lead 28 to the phase detector 21, and it has a pass band that is broad enough to pass these frequencies without introducing a phase shift.

The notch filter 8 usually causes some phase displacement of any power source frequencies it passes, and this displacement will appear in the input signal fed by the lead 26 to the phase detector circuit 21. Hence, it is the function of the phase detector 21 to compare the phase of the signal on the lead 26 with that of the power line 3, and to provide an output that is both proportional to the amplitude of the power source frequency appearing on the input lead 26 and indicative of the phase shift. This output is presented in two pairs of output leads. The first pair of phase detector output leads 29, 30 provide a direct current signal proportional to the component of the input signal on lead 26 that is in phase with the power source frequency as derived from the power line 3 by the leads 22, 23 and 24. The second pair of output leads 31, 32 provide a direct current signal proportional to the component of the input signal on lead 26 that is 90° out of phase from the power source frequency appearing on the power line 3. Hence, there are two voltage outputs that are proportional to the in phase and 90° out of phase components, which in summation are proportional to and in phase with the signal on the input lead 26.

The in phase signal of the leads 29, 30 is fed to a first pulse generator 33 and a first direction control 34, while the out of phase signal of the leads 31, 32 is fed to a second direction control 35 and a second pulse generator 36. The pulse generators 33 and 36 will each generate and deliver pulses, so long as direct current output signals are received over the leads 29, 30 and 31, 32 respectively. The output of the pulse generator 33 is fed through a lead 37 to binary counters 38, and the output of the pulse generator 36 is fed through a lead 39 to a second set of binary counters 40. The direction control 34 indicates to the binary counters 38 the direction in which they should count the pulses received from the generator 33, and this direction, in turn, is dictated by the polarity of the direct current signal on the leads 29, 30. Thus, for example, if rated power source frequency were 60 Hertz and it increased above this value the polarity of the signal on the leads 29, 30 would cause the direction control 34 to indicate to the binary counters 38 a first direction of counting, and if the power source frequency were to drop below 60 Hertz then the polarity on the leads 29, 30 may reverse to have the direction control 34 indicate an opposite direction of counting for the binary counters 38. A like mode of operation occurs between the direction control 35, the pulse generator 36 and the binary counters 40 for the out of phase component.

The binary counters 38 feed a digital-analog converter 41, and the binary counters 40 feed a digital-analog converter 42. The output of the digital-analog converter 41 feeds the control lead 19, while the output of the converter 42 feeds the control lead 20. In this fashion, the control lead 19 provides an indication to the corrective signal generator 15 of the component of the power source frequency passed through the notch filter 8 that is in phase with the power source frequency in line 3, and the control lead 20 provides an indication to the corrective signal generator 15 of the out of phase component of the power source frequency passed through the notch filter 8. The output of the corrective signal generator 15 is governed by these control signals, and as mentioned hereinbefore the output is fed through the lead 16 to the point 13 to beat against power source frequency passing through the notch filter 8. Upon cancellation at the point 13 the signal picked up by the lead 28 from the amplifier 7 falls, so that the phase detector circuit 21 in turn reduces its output. Upon this reduction pulse generators 33, 36 and direction control 34, 35 become dormant, so that there is no further change in the output of the generator 15 until there is a change in the amplitude or phase of the power source frequency passing through the notch filter 8.

Figure 2:
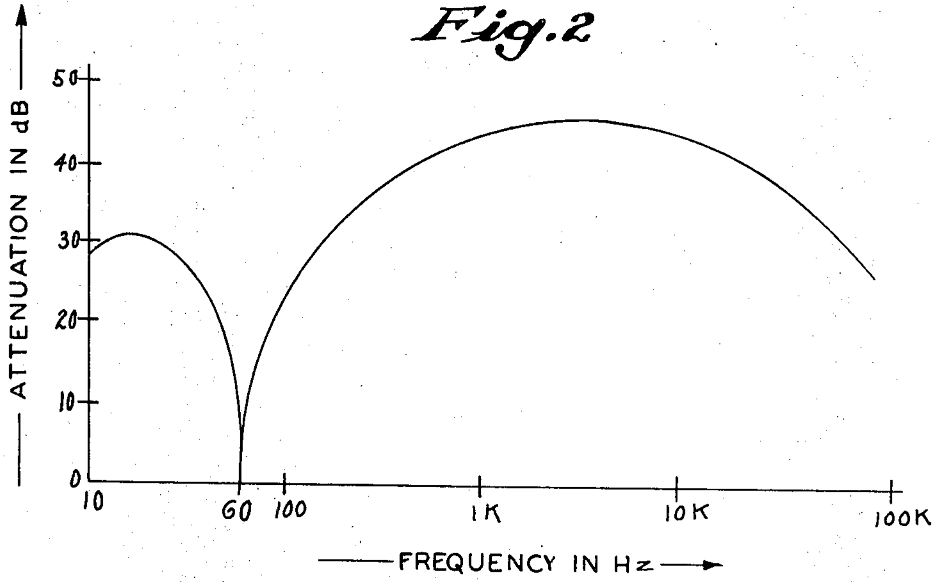
FIG. 2 is a graph showing the attenuation characteristics of the circuit of FIG. 1.

The circuits described adjust for any misalignment between the very narrow stop-band of the notch filter 8 and the power source frequency, and the entire circuitry within the dotted rectangle 43 may be termed an adjustment circuit. This circuit 43 preserves the very narrow pass band of the active filter of the invention in which the power source frequency has very little attenuation. A typical pass band for the active filter is shown in FIG. 2, the abscissa being in frequency and the ordinate representing attenuation in decibels. It is seen that the very narrow stop-band is aligned with the power source frequency of 60 Hertz, and that there is a notch-like character for the stop-band from which the term "notch" is derived. Some misalignment between the notch filter 8 and the power source frequency may be designed into the circuitry, so that the circuit 43 is continuously making adjustment at one side of the stop-band of the notch filter 8. This does not alter the overall circuit curve of FIG. 2.

Figure 3:
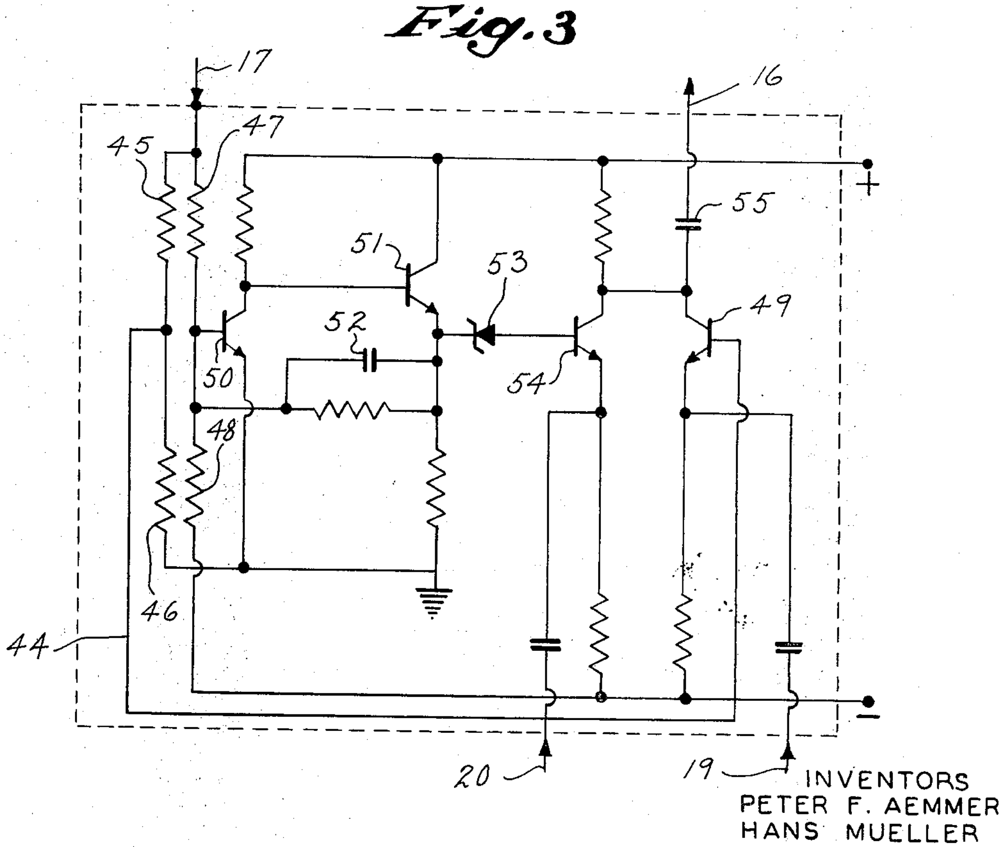
FIG. 3 is a schematic wiring diagram of a corrective signal generator that may be employed in practicing the invention.

Persons skilled in the art can readily develop the details of the sub-circuits of the adjustment circuit 43 described above and shown in rectangular boxes in FIG. 1. As an aid, however, some typical circuits that may be employed are shown in FIGS. 3–6. FIG. 3 for example, shows the corrective signal generator 15 together with the leads 17, 19, 20 and 43. A suitable direct current power supply connection for the generator 15 is shown and marked plus and minus for identification. The power source vlotage from the lead 17 is divided to a suitable level by means of voltage divider resistors 45, 46 and 47, 48. The signal from the resistors 45, 46 is fed over a lead 44 to the base of a transistor 49. In this transistor 49 the signal is amplified by a factor which is determined by the value of the resistance to which the lead 19 is connected in the converter 41, which converter 41 will be described hereinafter in sufficient detail to identify such resistance. The signal from the resistors 47, 48 is fed into a circuit including a pair of transistors 50, 51 and a capacitor 52. These circuit elements are similar to an integrator, in that the charging of the capacitor 52 provides a phase shift of 90° for the frequency involved, and this phase shifted signal is fed to a transistor 54. A Zener diode 53 is inserted to provide the correct D.C. bias for the transistor 54. This transistor 54 operates in the same manner as transistor 49, that is the output level is controlled by the lead 20. The resulting corrective signal of the two transistors 49, 54 appears as a sum of the signals at their collectors and it is coupled to the point 13 through the lead 16. Capacitor 55 is used to block the D.C. path to the point 13.

Figures 4, 5, 6:
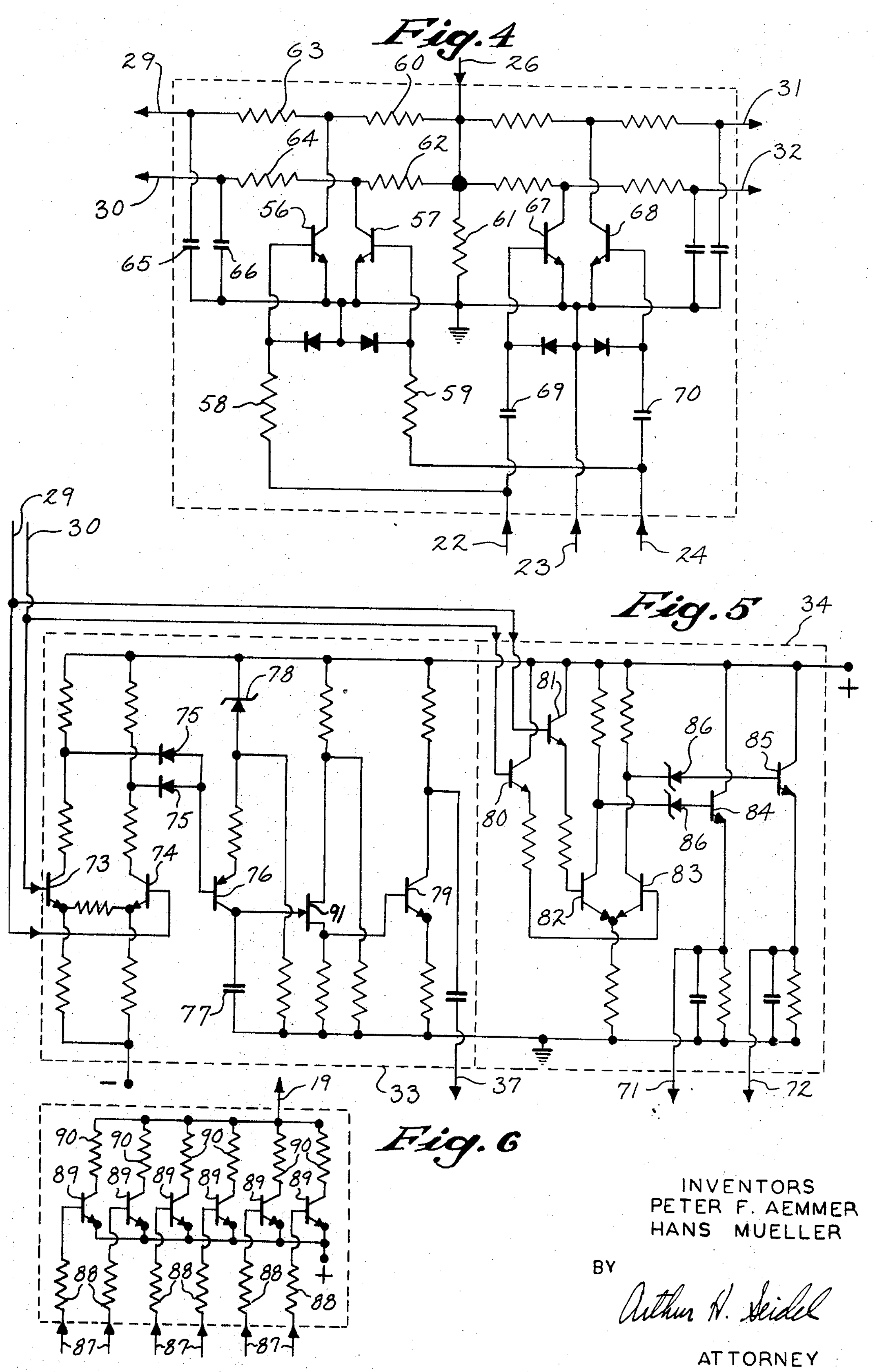
FIG. 4 is a schematic wiring diagram of a phase detector circuit that may be used in practicing the invention.
FIG. 5 is a schematic wiring diagram of a pulse generator and direction control as may be used in practicing the invention.
FIG. 6 is a schematic wiring diagram of a digital-analog-converter that may be used in practicing the invention.

FIG. 4 shows the phase detector circuit 21 with the input leads 22, 23, 24, the input lead 26, the in phase output leads 29, 30 and the out of phase output leads 31, 32. A first pair of switching transistors 56 and 57 is driven by the reference signal from the leads 22, 23, 24 through a pair of resistors 58 and 59. The input signal from the lead 26, which is a signal indicating the phase and amplitude of any power source frequency energy passing to the amplifier 7, is also fed to the switching transistors 56, 57. This input signal from the lead 26 is delivered to the transistor 56 through a resistor 60 in conjunction with a resistor 61, and the signal is also delivered to the transistor 57 through a resistor 62 in conjunction with the resistor 61.

One of the transistors 56, 57 can conduct during one half wave of the reference signal input of the leads 22, 23, 24, and the other transistor 56 or 57 can conduct during the other half wave. The output is filtered through resistors 63, 64 and capacitors 65, 66 and appears at the leads 29, 30. The polarity of the D.C. output is dependent upon the phase relation of the signal on lead 26 to the reference signal of leads 22, 23, 24, and the amplitude is dependent upon that of the signal 26. This output is also proportional to only the component of the signal on lead 26 that is in phase with the reference signal.

The right hand side of FIG. 4 is similar to the left hand side just described. There are a pair of switching transistors 67, 68, which in this instance are fed from the leads 22, 23, 24 through a pair of capacitors 69, 70 which develop a 90° phase shift. The signal of the lead 26 is also applied to the transistors 67, 68, and the filtered D.C. output at the leads 31, 32 is proportional to the 90° out of phase component of the input signal on the lead 26.

FIG. 5 shows the pulse generator 33 and the direction control 34 together with the leads 29, 30 which are the input for the circuit, the output lead 37 that delivers pulses to the binary counters 38, and output leads 71, 72 of the direction control 34 which also connect to the associated counters 38. FIG. 5 also shows direct current input terminals marked plus and minus, and the left hand portion of the figure marked by the dotted box 33 represents the part of the circuit comprising the pulse generator, while the dotted box indicated by the numeral 34 indicates the portion of the circuit comprising the direction control.

Referring now to the pulse generator 33 of FIG. 5, transistors 73, 74 comprise a differential amplifier. If the signal on the leads 29, 30 is one polarity one transistor 73, 74 may conduct, and if the polarity is reversed the other transistor 73, 74 may conduct. For the transistor 73 or 74 which has the more negative collector, its associated diode 75 conducts, and this biases a transistor 76. The collector current of the transistor 76 then charges a capacitor 77. This charging, however, can only commence when the collector potential of the transistor 76 is below the voltage of Zener diode 78, and the delay thus occasioned is for the purpose of having the direction control 34 first establish the direction in which counting will take place. Also, the rate of charge of the capacitor 77 is dependent upon the amplitude of the incoming signal on leads 29, 30.

When the voltage across capacitor 77 reaches a predetermined level a unijunction transistor 91 fires. A signal is then transmitted to a transistor 79 which reverses the polarity and amplifies, to deliver a pulse to the lead 39 which can be counted by the counter 38.

Referring now to the direction control 34 of the circuit of FIG. 5, a pair of transistors 80, 81 which are emitter followers serve for impedance matching and presenting a high impedance to the leads 29, 30. A pair of transistors 82, 83 form a differential amplifier in which saturation of either transistor is attained with little control voltage, so that one or the other conducts to operate an associated emitter follower transistor 84 or 85. A pair of Zener diodes 86 are inserted, as shown, to obtain desired voltage levels. The output of the transistors 84, 85 is filtered and delivered to the leads 71, 72, wherefore the polarity on these leads indicates to the binary counter 38 the direction of count. Also, a low output impedance is achieved from use of the emitter followers 84, 85.

The binary counters 38, 40 are of usual construction and need not be shown or detailed here. FIG. 6 illustrates the digital-analog converter 41, which is like the converter 42, with its several input leads 87 coming from the associated binary counters 38 and its output lead 19. It is seen that the digital-analog converter 41 comprises a bank of resistances 88 each in series with one of the counters 38 and a transistor 89. A second bank of resistors 90 are each connected to a transistor 89, and also to the lead 19. When a stage of counter 38 is at a positive voltage a current flows through the associated resistor 88 and saturates the associated transistor 89. The transistor 89 then functions as a switch to connect the associated resistor 90 to the positive terminal, and consequently the value of the total resistance between lead 19 and the positive terminal is dependent upon the count of the binary counter 38. This resistance value is an indication of the amplitude of the in phase component of the power source frequency detected on the leads 28 and 26. It is therefore an indication for the corrective signal generator 15 of what the in phase component amplitude delivered by its transistor 49 (see FIG. 3) should be.

The foregoing description for the pulse generator and direction control 33, 34, the counter 38 and converter 41 is also applicable to the corresponding circuits 35, 36, 40 and 42.

There is thus provided an active type filter that is effective for transmitting a selected frequency, such as a power source frequency, with very little attenuation while presenting a very effective attenuation of interference frequencies, particularly conducted interference. The filter, as described, employs a notch filter 8 connected to the line that passes frequencies other than the power source frequency. These frequencies are amplified and induced into the line by a transformer 5 so as to cancel the unwanted frequencies originally appearing on the line. The invention also includes a corrective circuit 43 for compensating drift in the power source frequency or drift in the narrow pass band of the notch filter. This corrective circuit has a phase detector for sampling any power source frequency that passes the notch filter and detecting both the amplitude and phase shift. The particular embodiment shown then feeds the detected information to pulse generators and direction controls for operating binary counters and a converter which control a corrective signal generator which in turn produces an output that beats against the power source frequency passing through the notch filter to cancel it from the circuit of the invention. Thus, a corrective circuit is taught in conjunction with the basic circuit of the invention.

In describing the invention a power source has been referred to as feeding the active filter. It is to be understood that this term is used broadly and other types of circuits may be connected to the input and output terminals 1, 2. The filter of the invention is intended for use in any application for which filtering of the type described herein is desired. The foregoing description sets forth a preferred embodiment only, and the scope of the invention as protected by patent is to be determined from the following claims, it being recognized that the invention may be practiced in circuits varying from those of the accompanying drawings and the description herein.

We claim:

1. In an active band pass filter the combination comprising:

a correction transformer having the first and second windings with the first windings for connection with a power source;

a notch filter having a stop-band corresponding to power source frequency, and having an input for sampling frequencies received from the power source;

an amplifier between the output of the notch filter and the second winding of said correction transformer;

a pair of corrective signal generators each having an input receiving the power source frequency and an output feeding against the output of said notch filter to cancel power source frequencies passed by said notch filter, one of said corrective signal generators providing an output 180° out of phase with power source frequency and the other generator providing a corrective signal ninety degrees thereto;

a phase detector circuit for receiving an input signal indicative of any phase shift of a power source frequency passing through said notch filter and having outputs comprising signal components in phase with and at ninety degrees out of phase from the power source frequency; and control circuits between said phase detector circuit and said corrective signal generators that feed controlling signals to said generators for governing the outputs thereof, such control circuits joining the in phase output of the phase detector circuit with the 180° out of phase corrective signal generator and also joining the 90° out of phase output of the phase detector circuit with the 90° out of phase corrective signal generator.

2. An active band pass filter in accordance with claim 1 in which each control circuit comprises:

a pulse generator joined to its associated output of said phase detector circuit;

a direction control joined to its associated output of said phase detector circuit;

binary counters fed by the pulse generator and direction control; and a digital-analog converter fed by the binary counters and joined to the associated corrective signal generator.

3. In an active band pass filter the combination comprising:

input and output terminals;

a power line between terminals;

a stop-band notch filter having its stop-band corresponding to the power source frequency of said power line, and in circuit connection with said power line to sample frequencies appearing on the power line;

an amplifier having its input joined to the output of the notch filter and having its output coupled to the power line to feed frequencies passed by the notch filter back to the power line; and a corrective circuit correcting for power source frequencies passing through said notch filter, said corrective circuit having: an output that beats power source frequency against the output of the notch filter, a first input supplying power source frequency, and a second input indicating magnitude and phase of a power source frequency passing through the notch filter.

References Cited

UNITED STATES PATENTS

| | | | |
|---|---|---|---|
| 2,758,286 | 8/1956 | Wible | 307—105 X |
| 2,879,486 | 3/1959 | Grandmont et al. | 307—105 X |
| 2,959,738 | 11/1960 | Nagai | 307—105 X |

ROBERT K. SCHAEFER, Primary Examiner

T. B. JOIKE, Assistant Examiner

U.S. Cl. X.R.

333—70, 76